UNITED STATES PATENT OFFICE.

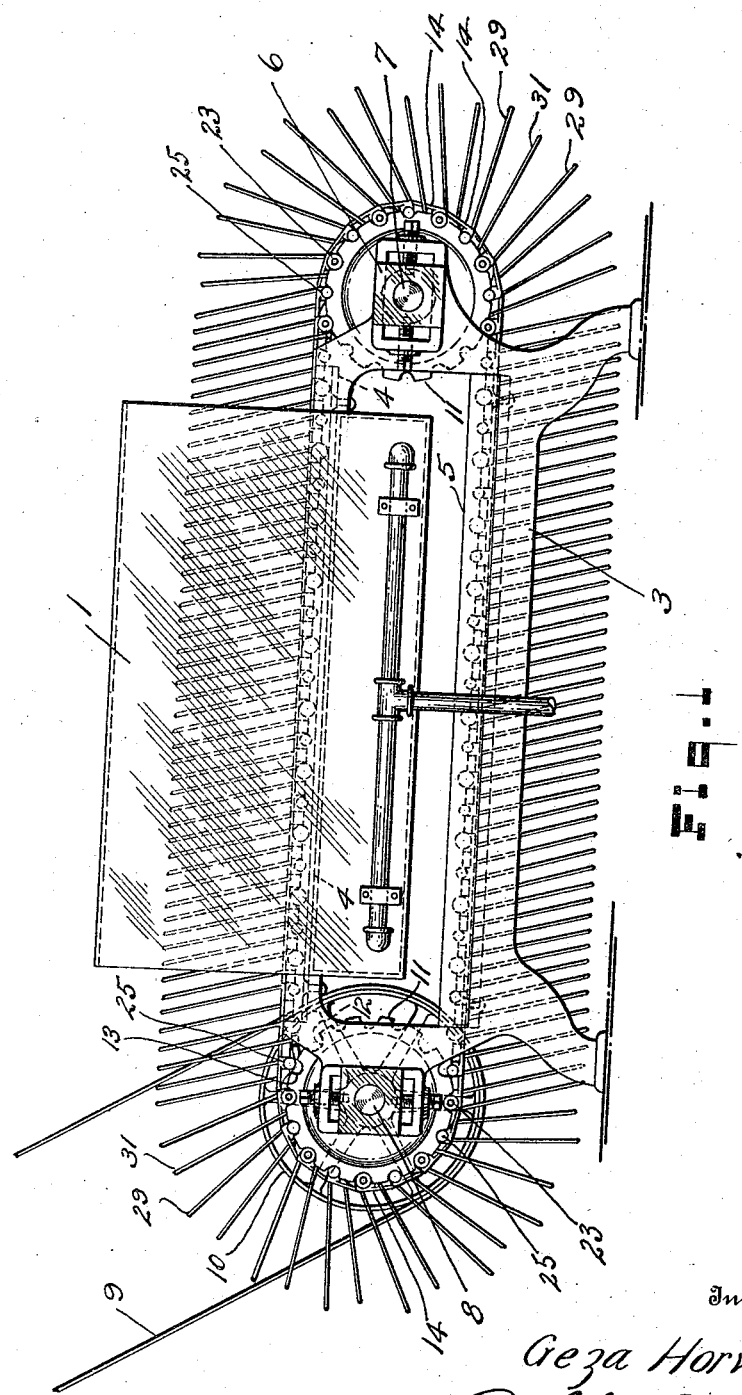

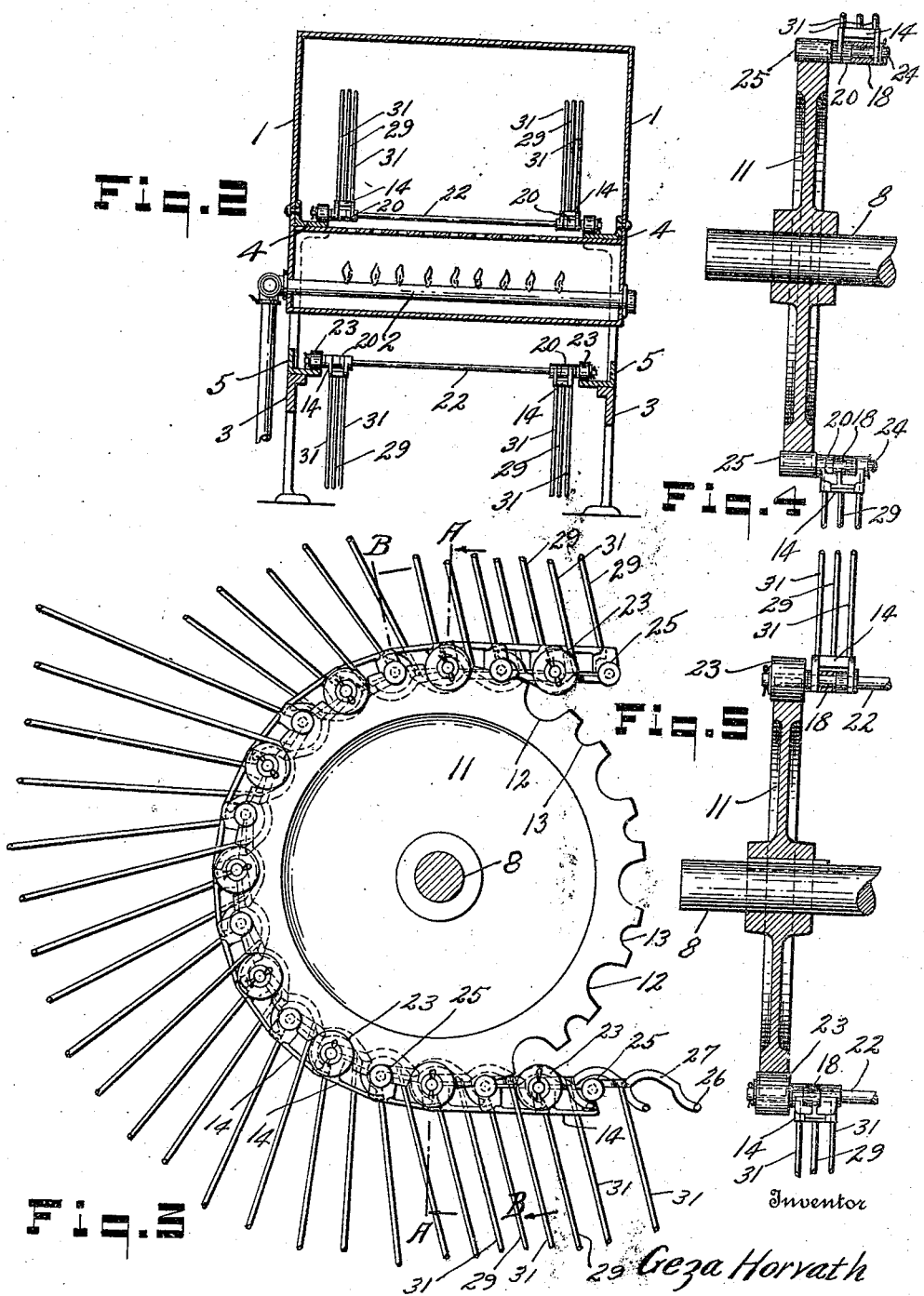

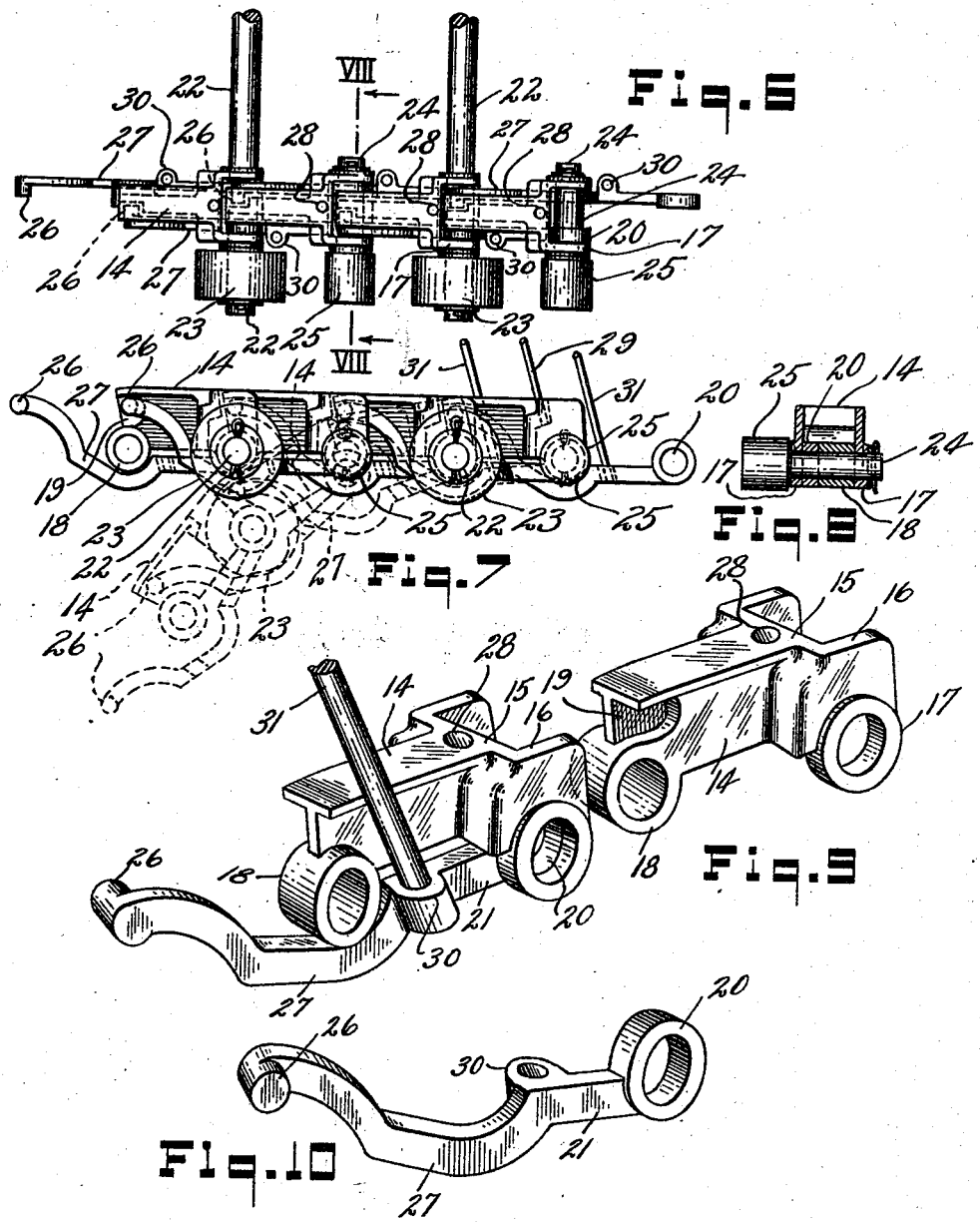

GEZA HORVATH, OF HIGHLAND PARK, MICHIGAN.

CHAIN.

1,420,705.  Specification of Letters Patent.  Patented June 27, 1922.

Application filed August 20, 1921. Serial No. 494,007.

*To all whom it may concern:*

Be it known that I, GEZA HORVATH, a citizen of the United States of America, residing at Highland Park, in the county of Wayne and State of Michigan, have invented certain new and useful Improvements in Chains, of which the following is a specification, reference being had therein to the accompanying drawings.

This invention relates to chains and conveyors, and has special reference to rack chains that may be advantageously used as conveyors or carriers in connection with ovens, baths, kilns, and stuctures through which articles may be conveyed, to be dried, baked, coated, or otherwise treated. As an instance of the use of such chains or conveyors is the drying of wet lithographing material which has been applied to tin, or other metallic sheets. Another instance is the drying or baking of lacquered or enameled ware, and in either instance a suitably heated oven is employed with the rack chains or carriers passing therethrough so that the plates or ware will receive a heat treatment while travelling from one end of the oven to the opposite end. When plates or sheets are to be conveyed through an oven the chains are provided with spacers or arms between which plates are placed and supported on the chains. In the instance of lithographic plates considerable care must be exercised to prevent the plates from being injured, and proper spacing of the arms of the chain will greatly facilitate the loading and unloading of a plate conveyor.

The primary object of my invention is to provide rack chains or carriers that have been particularly designed for supporting and maintaining, in spaced relation, lithographic plates or sheets, and the chains are composed of articulated driven and float members which will increase the carrying capacity of the chains, permit of easy loading and unloading, and decrease the usual length of a drying or baking oven.

Another object of this invention is to provide conveyor chains having articulated driven members or links and floating members, all of said members having spacers which are maintained in a defined relation, particularly while the driven and floating members are adjacent drive members.

A further object of this invention is to provide conveyor chains affording uninterrupted supports for plates or articles on the chain, and said chains are constructed or designed to prevent sagging, particularly when in engagement with drive members, so that there will be a defined relation of spacers or supports on the chains while moving other than in a straight or rectilinear direction.

A still further object of this invention is to provide a chain composed of articulated members which, when moved other than in a straight direction, assume obtuse angles relative to one another, and associated with such members are floating members which assume angles relative to the articulated members and represent the base of a triangle formed by adjacent articulated members.

The above are a few of the objects attained by my invention, and others will appear as the construction is described and defined by the appended claims.

Reference will now be had to the drawing, wherein

Figure 1 is a side elevation of a drying or baking apparatus, including an oven, showing an endless conveyor or carrier, in accordance with my invention;

Fig. 2 is a cross sectional view of the same;

Fig. 3 is an enlarged side elevation of a drive member about which the conveyor or carrier is trained;

Fig. 4 is a cross sectional view of the same showing the manner of supporting the conveyor relative to the drive member;

Fig. 5 is a similar view showing the manner of establishing a driving relation between the conveyor and the drive member;

Fig. 6 is a plan of a portion of the chain forming part of the conveyor;

Fig. 7 is a side elevation of the same showing by dash lines how the chain may travel in a curvilinear direction;

Fig. 8 is a cross sectional view taken on the line VIII—VIII of Fig. 6;

Fig. 9 is a perspective view of separated driven members or links of the chain, and Fig. 10 is a perspective view of one of the floating members of the chain.

As set forth in the beginning, my improved chains may be advantageously used as a conveyor in connection with an oven and as showing such use reference will first be had to Figures 1 to 5 inclusive, particularly Fig. 1 showing an oblong oven 1 provided with a conventional form of heating apparatus 2. The oven 1 may be supported by a suitable frame work 3 affording tracks 4 and 5, each composed of channel rails with the track 4 disposed longitudinally within the oven and a track 5 disposed longitudinally beneath the oven. At the ends of the frame work 3 are adjustable bearings 6 for transverse shafts 7 and 8, the latter being driven from a suitable source of power, for instance by a belt 9 and a belt wheel 10.

On the shafts 7 and 8 are longitudinally aligning sets of driven members 11, somewhat similar to sprocket wheels, each member, as best shown in Fig. 3, having its periphery provided with large recesses 12 and small recesses 13, said large and small recesses alternating about the periphery of the driven member. The driven members are adapted to support and move an endless conveyor or carrier, composed of two endless parallel chains and the chains are supported by the tracks 4 and 5 during movement in or below the oven 1. The chains are identical in construction, therefore only one will be described and reference will now be had to Figs. 6 to 10 inclusive.

The chain is composed of articulated driven members, each member comprising a body 14 having one end thereof bifurcated or forked to provide an abutment 15 and side lugs 16 having barrels 17. At the opposite end of the body 14 is a single barrel 18 and a side recess 19. The single barrel 18 is of less width than the distance between the barrels 17 at the opposite end of the body, and the single barrel 18 is adapted to be placed against the inner wall or side face of one of the barrels 17 of an adjacent member and leaves sufficient room for the single barrel 20 of a floating member 21. The barrels 17, 18, and 20 are then in alignment and may be pivotally connected or articulated by a transverse rod 22 which extends to and connects similar articulated driven members forming part of the other chain, which, together with the chain now being described, composes the endless conveyor or carrier. The ends of the transverse rod 22 are provided with rollers 23 adapted to engage in the large recesses 12 of the drive members 11 and thus establish a driving relation between the chains and said drive members.

Thus far driven members are articulated by the transverse rods 22 and instead of using rods for connecting all of the driven members, I use short pins or stud shafts 24 alternating with the rods 22 and the outer ends of the pins or shafts 24 have heads 25 adapted to engage in the small recesses 13 of the drive members 11 and prevent articulated driven members from sagging between the driving points established between the drive member 11 and the chain. In other words, the driven members will be at all times maintained in a defined relation when trained about a drive member.

Considering two adjacent or articulated driven members, with special reference to Figs. 6 and 9, the recess 19 of one member is at an opposite side of one member from the recess of the adjacent member, the recesses alternating in this manner throughout the length of the chain. The purpose of such alternating recesses is to permit of the floating members 21 being alternately arranged, some at one side of the chain and some at the other side. With the barrel ends of the floating members 21 pivotally supported on the rods 22 and the barrel ends of adjacent floating members pivotally supported on the pins or shafts 24, the floating members can be placed alternately at opposite sides of the chain and said floating members have side bosses or guides 26 adapted to engage in the side recesses 19 of the bodies 14. The guides 26 will slide in the recesses 19 when the chain is passing about the drive member and said floating members have curved portions adapted to contact with the barrels of articulated members, as best shown in Fig. 7, and co-operate with abutments 15 and ends of the bodies 14 in limiting any breaking down movement of the joint between driven members. In other words, the joints between the articulated members may break up or out, as is necessary, when the chain passes about a drive member, otherwise the abutting ends of the articulated members will maintain said members in alignment and this is especially true as the rollers 23 travel on the tracks 4 and 5 between the sets of drive members. The rollers 23 will reduce friction to a minimum between the chain and the rail of the track and each chain will have a comparatively flat upper supporting surface on which plates or articles may be placed.

Since ends of the floating members 21 are pivotally held and ends slidably held, the floating members 21 may adjust themselves during the breaking or adjustment of the joint between the articulated members of the chain. The curved portions 27 of the floating members will move away from the barrels of articulated members and as said members assume an angular relation relative to each other, the floating members associated with such angular articulated members will assume an angle representing the base of a triangle formed by the floating member and its adjacent articulated members.

The bodies 14 of the articulated members, adjacent the abutments 15, are provided with angularly disposed sockets 28 for spacers or arms 29 which extend upwardly from the upper supporting surface of the chain and it is between such spacers that plates or articles may be placed. The spacers of one chain will transversely align with the spacers of the other chain and in order to increase and practically double the carrying capacity of the chains, the floating members 21 are provided with angularly disposed sockets 30 for spacers or arms 31 similar to the spacers or arms 29. The spacers 31 of the floating members 21 will be alternately arranged at opposite sides of the chain and the planes of the spacers 31 are equally spaced from the planes of the spacers 29 when the chain is in a horizontal position. Equal spacing is also maintained, when the chain passes about a drive member, by the floating members 21 and this is best brought out in Fig. 3 where it will be noted that the plane of the spacers 31 bisects the angle formed by the planes of contiguous spacers 29. It is obvious that the outer ends of the spacers 29 and 31 of each chain will be farther apart than the inner ends of said spacers, consequently the pockets or stalls afforded by the spacers will be opened at the drive members 11, thus permitting easy loading and unloading of the conveyor chain at the ends of the oven 1. Lithographic plates may be readily placed between the spacers with the edges of said plates resting on the upper surfaces of the chains and there is no danger of the plates slipping or becoming accidentally displaced while passing through the oven. The pockets or stalls are opened sufficiently to permit of the plates being easily inserted in the pockets or removed therefrom.

On account of the floating members the chains cannot pass about the drive members 11 similar to a sprocket chain on a sprocket wheel, so the chains are supported at the inner faces of the drive members, as best brought out in Figs. 4 and 5, and the rollers 23 will co-operate with the abutting ends of the articulated members in preventing the chains from sagging when moving longitudinally of the oven. I attach considerable importance to the fact that the floating members are free to adjust themselves, that there is practically no weight on the floating members and that such members are not depended upon for establishing a driving relation between members of the chain or between the chain and the drive member. I have shown the floating members as having side guides or bosses to engage in the recesses of the articulated members, but it is apparent that the free shifting ends of the floating members may be forked or bifurcated to ride on the rods 22 and the pins 24, or any other arrangement may be provided by which the floating members may be self adjusting and assume angular relations different from that of the articulated driven members.

It is thought that the operation and utility of my chains or conveyor will be apparent without further description, and while in the drawings there is illustrated a preferred embodiment of my invention, it is to be understood that the structural elements are susceptible to such changes, in size, shape, and manner of assemblage, as fall within the scope of the appended claims.

What I claim is:—

1. In a movable driven support articulated members by which said support is driven, spacers on said members floating members carried by said articulated members, and spacers on said floating members.

2. A driven support as in claim 1 trained on a drive member and the relation of said floating members to said articulated members being such that all of said spacers are approximately equally spaced when adjacent said drive member.

3. A driven support for spacers comprising articulated members, and floating members carried by said articulated members and cooperating therewith in equally spacing said spacers for rectilinear and curvilinear movement.

4. The combination of drive members, articulated driven members trained about said drive members, spacers carried by said driven members, rollers supporting said driven members relative to said drive members and establishing a driving relation, and means carried by said driven members and engaging said drive members to establish a defined angular relation between said driven members when adjacent said drive members so as to maintain said spacers in a defined angular and spaced relation.

5. The combination set forth in claim 4 wherein some of said driven members are freely supported by adjacent driven members, and are provided with spacers which extend in planes that bisect the angularly disposed planes of adjacent spacers.

6. A chain composed of articulated members which when moved other than in a straight direction assume an obtuse angle relative to one another, and floating members supported from said articulated members and which floating members assume angles relative to said articulated members with each floating member representing the base of a triangle formed by adjacent articulated members.

7. A chain as in claim 6 wherein each floating member has one end pivotally supported by an articulated member, and the other end slidably supported by an adjacent articulated member.

8. A chain as in claim 6, wherein said articulated and floating members have abutments adapted to contact and prevent sagging of the chain when moving in a straight direction.

9. An endless conveyor comprising parallel chains, drive members about which said chains are trained, rods connecting said chains, rollers on the ends of said rods adapted to engage said drive members and establish a driving relation therewith, and pins carried by said chains adapted to engage said drive members and prevent sagging of portions of said chains.

10. An endless conveyor as in claim 9 and tracks between said drive members and on which said rollers travel and support the chains at the inner sides of said tracks and drive members.

11. An endless conveyor adapted to support plates on edge, said conveyor comprising chains, each composed of articulated members and floating members, and spacers carried by said members and providing stalls for the plates; the relation between said articulated and floating chain members being such that the spacers of said floating members may adjust themselves equi-distant from the spacers of said articulated members.

12. A conveyor as in claim 11 wherein said floating members have ends pivotally supported by some of said articulated members and the opposite ends loosely supported by other of said articulated members.

13. A chain construction including plate sustaining members pivotally connected end to end, floating members having ends supported at the pivots of said plate sustaining members and opposite ends loosely supported by adjacent members, and means carried by said floating members adapted to assist in retaining plates on said plate sustaining members.

14. A chain of the type described comprising pivotally connected driven members, arms carried thereby, floating members loosely supported by said driven members, and arms carried by said floating members at opposite sides of said driven members.

15. A chain as in claim 14, wherein the floating members are supported to engage the pivoted portions of said driven members and prevent breaking down of such pivoted portions.

16. The combination of chains, floating members alternately disposed at the sides of each chain, arms carried by said chains, and arms carried by said members and co-operating with the arms of said chains in providing stalls above said chains.

17. The combination of chains providing stalls, and self adjusting members carried by said chains and subdividing the stalls of said chains.

In testimony whereof I affix my signature in presence of two witnesses.

GEZA HORVATH.

Witnesses:
 ANNA M. DORR,
 KARL H. BUTLER.